United States Patent

[11] 3,568,124

| [72] | Inventor | Hans Conrad Sonderegger<br>Winterthur, Switzerland |
|---|---|---|
| [21] | Appl. No. | 734,646 |
| [22] | Filed | May 31, 1968 |
| [45] | Patented | Mar. 2, 1971 |
| [73] | Assignee | Kistler Instrument AG<br>Winterthur, Switzerland |
| [32] | Priority | June 1, 1967 |
| [33] | | Switzerland |
| [31] | | 7784/67 |

[54] PIEZORESISTIVE FORCE- AND PRESSURE-MEASURING ELEMENT
16 Claims, 7 Drawing Figs.

[52] U.S. Cl. .................................................. 338/4,
338/41, 338/42, 73/398
[51] Int. Cl. .................................................. G01l 1/22
[50] Field of Search .......................................... 338/4, 42,
36, 41; 73/398 (R), (Inquired)

[56] References Cited
UNITED STATES PATENTS

| 3,389,362 | 6/1968 | McLellan | 338/4 |
| 3,417,361 | 12/1968 | Heller et al. | 338/4X |
| 3,457,536 | 7/1969 | Dean et al. | 338/4 |

Primary Examiner—Rodney D. Bennett, Jr.
Assistant Examiner—T. H. Tubbesing
Attorney—Craig, Antonelli, Stewart & Hill ABSTRACT: A piezoresistive element for pressure- and force-measurements in which a silicon disc or the like, provided with resistive paths diffused in the same is supported on a metallic support ring, and in which an insulator ring is mounted on the support ring; the insulator ring is provided with contact lands or the like from an intermediate stage and thin wire connections between the same and the contact lands in the resistive paths.

INVENTOR
HANS CONRAD SONDEREGGER

BY Craig & Antonelli

ATTORNEYS

PIEZORESISTIVE FORCE- AND PRESSURE-MEASURING ELEMENT

The present invention relates to piezoresistive force- and pressure-measuring elements, and more particularly to piezoresistive force- and pressure-measuring devices which utilize the change in the resistive paths diffused into silicon plates.

A few years ago the transistor technology produced a byproduct having interesting development possibilities. More particularly, it involves certain conductive layers or metals diffused on silicon plates as used for transistors, which develop piezoresistive properties when mechanical loads are applied. The silicon discs are equipped with resistive paths consisting of metal layers deposited on the silicon discs. As soon as a mechanical strain is induced in the silicon disc by exposure to a mechanical stress, a considerable change of resistance occurs in the corresponding resistive paths. This change of resistance is linear over a relatively large range with the change of mechanical strain of the silicon disc. These phenomena can be utilized in a simple manner by means of a bridge circuit for the determination of the mechanical strain of the silicon disc. Accordingly, a piezoresistive pressure-measuring element consists generally of a silicon disc or similar semiconductive element with diffused resistive paths which are located where a strain occurs, particularly where the largest strain occurs in the silicon disc. The different resistive paths may be connected in a conventional manner to a bridge circuit of any known design at the measuring apparatus. With such a design, it is possible to measure forces entering in or acting at only one point or those acting over the entire surface of the silicon disc which produce on the silicon disc a mechanical stress and therewith a bending. After corresponding static calibration, the sensitivity of the measuring element for a constant source voltage can be given by $mv/at$ or $mv/kp$, where $mv$ is in millivolts, $at$ is in atmospheres and $kp$ is in kilopound. It has been found that with proper aging it is possible to obtain a constant sensitivity of the element.

Considerable problems are encountered as soon as the element has to be assembled in a rig or mount which enables an easy installation thereof into the places where pressures or forces are to be measured. For this purpose, assembly and sealing problems as well as connecting problems of the diffused resistance paths have to be solved. In order to further clarify the underlying problems, a measuring element for pressure measurements, as currently commercially available on the open market, will be referred to in the following explanation. The element of the present invention will then be explained on the basis of such commercially available element.

Accordingly, it is an object of the present invention to provide a piezoresistive force- and pressure-measuring device which avoids by simple means the drawbacks and shortcomings encountered in the prior art.

It is another object of the present invention to provide a piezoresistive force- and pressure-measuring device which can be readily installed at the places where the measurements are to be made.

A further object of the present invention resides in a piezoresistive force- and pressure-measuring device which is simple in construction, can be properly sealed and permits appropriate connections.

Still a further object of the present invention resides in a piezoresistive force- and pressure-measuring device which excels by sturdiness and long-life of operation.

These and further objects, features and advantages of the present invention will become more obvious from the following description when taken in connection with the accompanying drawing which shows, for purposes of illustration only, several embodiments of the present invention, and wherein.

Figure 1:
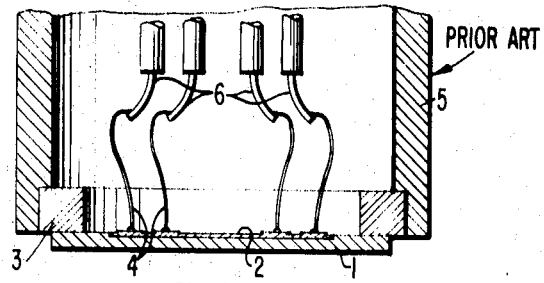
FIG. 1 is a partial cross-sectional view through a commercially available piezoresistive pressure element of open design taken along line 1–I of FIG. 3.

Referring now to the drawing wherein like reference numerals are used throughout the various views to designate like parts, and more particularly to FIG. 1, the commercially available piezoresistive measuring element illustrated in this figure consists of a silicon disc 1, of the diffused resistance path 2 and of the metal holding ring 3. This ring 3 is connected with the silicon disc 1 by means of a conventional soldering process. This measuring element 1, 2, 3, is then assembled in the casing 5 in which are mounted the wires 6. The ends of these wires 6 are connected by way of thin metal wires 4 with the diffused resistance path system 2 in accordance with a well-known method used in the transistor technology.

Figure 2:
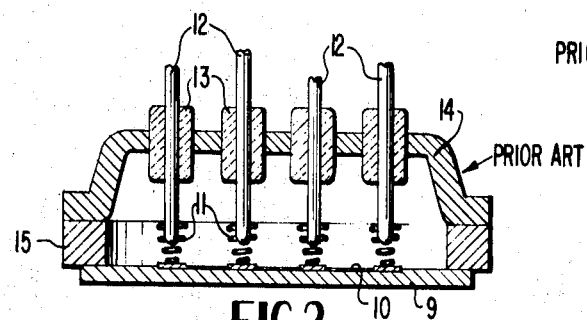
FIG. 2 is a partial cross-sectional view through a commercially available piezoresistive pressure element of closed design.

According to FIG. 2, a commercially available piezoresistive pressure element of the closed design consists of the silicon disc 9, of the diffused resistance path system 10, of the spring contacts 11, and of the connector wires 12 which are held in insulator bushes 13 assembled in cover plate 14. The cover plate 14 is welded to the holder ring 15.

Figure 3:
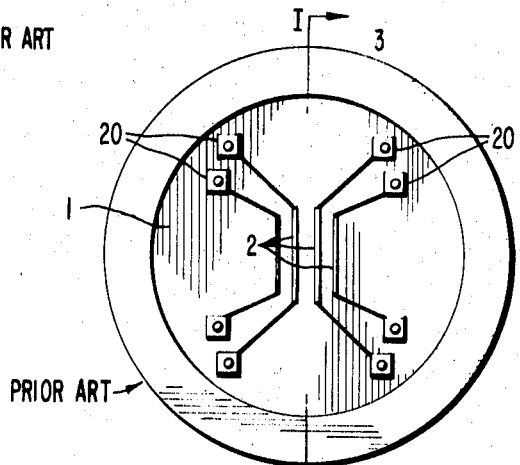
FIG. 3 is a top plan view on the commercially available piezoresistive pressure element of open design, as shown in FIG. 1.

FIG. 3 illustrates the simple piezoresistive pressure element of FIG. 1 as viewed from above. The diffused resistance paths 2 are located in places where the largest mechanical strain occurs in the silicon disc 1. The resistance paths 2 are connected with normal contact lands 20. For certain applications further resistance paths may be applied by diffusion in locations of the silicon disc 1 where no strain occurs, for example, along the edges of the discs. Such paths can be utilized for temperature compensation. The holding ring of the silicon disc 1 is again designated by reference numeral 3.

Figure 4:
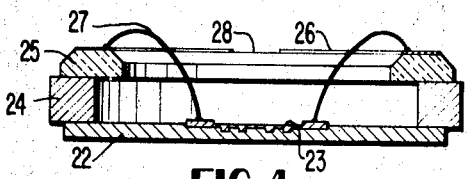
FIG. 4 is a cross-sectional view through a piezoresistive pressure element according to the present invention in open design, taken along line IV–I of FIG. 5.

In FIG. 4 a piezoresistive pressure element according to the present invention is shown prior to assembly. It consists of the silicon disc 22 onto which the resistance system 23 is diffused. The holding ring 24 is solidly connected with the silicon disc 22. An insulator ring 25 which is fastened on the holding ring 24, carries on its surface metallized sections 26. These metallized lands 26, which serve as intermediate stations, are connected by way of thin metal wires 27 with the resistance system 23; the wires 27 can be made as short as possible by the use of the intermediate lands 26 in order to obtain satisfactory long life conditions. The thick film layers of metal forming the lands 26 on the insulator ring 25 are subdivided into a number of sectors corresponding to the required number of connections, usually 4 or 6 connections. Insulator lands 28 are located between the sectors of layers 26. The contact lands 26 can be connected with heavy connecting wires by means of soldering or other known techniques.

Figure 5:
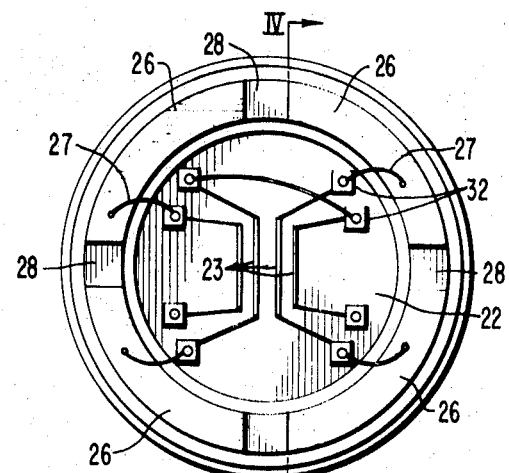
FIG. 5 is a partial top plan view on the piezoresistive pressure element of the present invention illustrated in FIG. 4.

The contact sectors 26 are shown again in FIG. 5. From them the thin wires 27 are connected with the contact lands 32 on the silicon disc 22. This connection is usually made by thermocompression bonding. In this manner, and particularly by the use of this method, a rugged element is obtained whose sensitive connections are short and solidly anchored. The connection of the wiring leading to the outside of the transducer can be realized then in any conventional manner from the contact lands 26. The present invention thus enables the construction of simple, rugged, operationally reliable and safe elements which can be assembled into various body forms. Two examples of such assemblies are shown in FIGS. 6 and 7.

Figure 6:
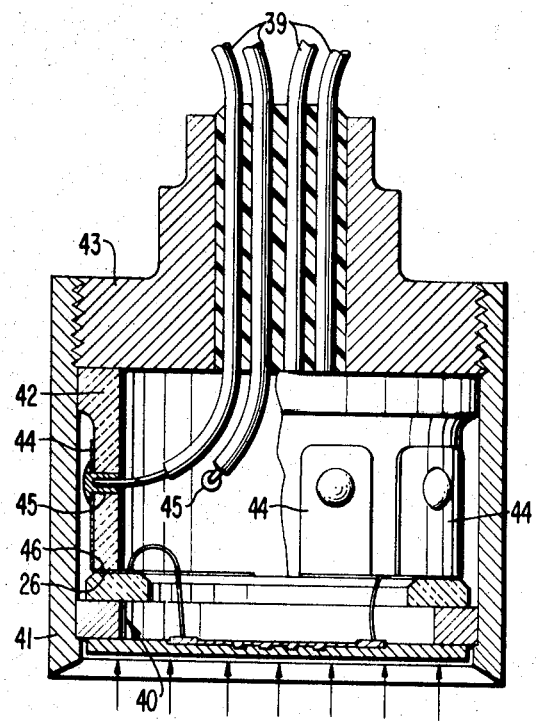
FIG. 6 is an axial cross-sectional view through a modified embodiment of a piezoresistive pressure element according to the present invention with a contact ring in the assembled form.

FIG. 6 shows an assembly with an axial arrangement of the connecting wires 39. The piezoresistive element according to the present invention and generally designated by reference numeral 40 is built into the body 41. The insulator pressure sleeve 42 is pressed by means of cover 43 against the contact lands 26 of the element 40. The insulator sleeve 42 has the same number of metallized conducting lands 44 obtained by standard methods of metallization as corresponds to the number of contact lands 26. The ends of the wires 39 are inserted into the connecting holes 45 of these conducting lands 44 and are soldered to the metallic surface thereof. The conducting lands 44 are extended to the end faces 46 and thus result in a completely satisfactory connection with the contact lands 26. The metallized conducting lands 44 are applied to the insulator sleeve in any conventional manner, for example, by evaporation, by brushing, etc.

Figure 7:
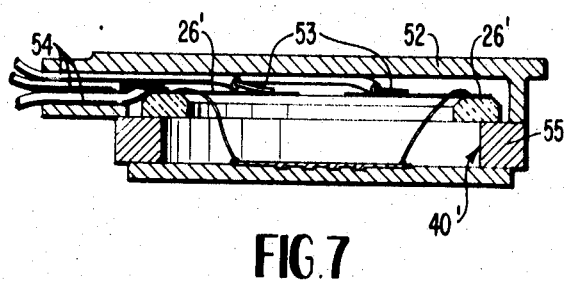
FIG. 7 is an axial cross-sectional view through a still further modified embodiment of a piezoresistive pressure element according to the present invention assembled with side connection.

In FIG. 7 an assembly is shown with lateral leadout of the wires 54 which results in a very low structural height and therewith in a very flat transducer design. The wire ends 53 of the wires 54, stripped of their insulation, are connected with the contact lands 26' of the piezoresistive measuring device of the present invention, generally designated by reference number 40', by means of soldering or any other known methods. After this, the cover plate 52 is assembled and connected with holding ring 55. The entrance hole of the wires 54 is then hermetically sealed by means of a compound.

It can be seen from the foregoing that the piezoresistive measuring element of the present invention entails considerably advantages compared to the present state of technology. On the one hand, the element of the present invention forms a fully enclosed unit. The highly sensitive thin wire connections are short and are solidly anchored and supported on both ends. These connections are made in the preassembly stage and need not be touched again subsequently when the elements are assembled in the transducer. The contact lands on the insulator ring enable simple connections for the wiring to the outside, either by direct contact or by means of an insulating pressure ring such as contact sleeve 42. Since the contact sleeve is considered an additional part of the piezoresistive element, it takes care for a simple and operationally reliable solution as regards the connecting problem.

While I have shown and described only several embodiments in accordance with the present invention, it is understood that the same is not limited thereto but is susceptible of numerous changes and modifications as known to a person skill in the art, for example, the discs could be made of germanium or similar material instead of being made of silicon, and I therefore do not wish to be limited to the described and illustrated details but intend to cover all such changes and modifications as are encompassed by the scope of the appended claims.

I claim:

1. A piezoresistive element for pressure and force measurements, which includes a support ring, a silicon disc supported on said support ring, and said silicon disc being provided with resistive paths diffused into the disc, wherein the improvement comprises insulator ring means mounted on said support ring and having metallized contact land means on the exposed end face thereof disposed in a plane transverse to the axis of said insulator ring means, and connecting means including thin wire connections for connecting the metallized contact land means with the resistive paths on the silicon disc.

2. A piezoresistive element according to claim 1, further comprising an additional insulator sleeve having metallized lands, said lands being adapted to be connected to connecting wires by simple soldering, and said lands being connected to the land means by contact pressure along the faces of the piezoresistive element.

3. A piezoresistive element for pressure and force measurements, comprising a silicon disc attached to a metallic holding ring, at least one resistive path diffused on a silicon disc, and an insulator ring made of ceramic insulator material having contact lands on a face thereof disposed in a plane transverse to the axis of the insulator ring and the contact lands being connected with the metallic holding ring.

4. A piezoresistive element according to claim 3, wherein said insulator ring is connected to said metallic holding ring by means of a hard soldering connection.

5. A piezoresistive element according to claim 3, wherein said insulator ring is connected to said metallic holding ring by means of a thermocompression bonding joint.

6. A piezoresistive element according to claim 3, wherein an additional insulator sleeve having conductive lands is connected to said contact lands by contact pressure.

7. A piezoresistive element for pressure and force measurements which includes a semiconductor element provided with at least one resistive path diffused into the same and a support element for supporting the semiconductor element, wherein the improvement comprises insulator means on said support element, contact means located on an exposed end face of said insulator means disposed in a plane transverse to the axis of said insulator ring, and thin-wire connecting means operatively connecting the resistive path with said contact means.

8. A piezoresistive element according to claim 7, wherein said support element is a conductive element and said insulator means is a ceramic element secured on said conductive element.

9. A piezoresistive element according to claim 8, wherein said ceramic element is secured to the metallic conductive element by means of a hard soldering connection.

10. A piezoresistive element according to claim 8, wherein said ceramic element is secured to the metallic conductive element by means of a thermocompression bonding connection.

11. A piezoresistive element according to claim 7, further comprising an additional insulator element provided with contact means in pressure contact with said first-mentioned contact means, and leadout wire means connected to the contact means on said additional insulator element.

12. A piezoresistive element according to claim 7, further comprising cover means fastened to said support element, and leadout wire means electrically connected with said contact means.

13. A piezoresistive element according to claim 12, wherein said leadout wire means extend laterally out of said element.

14. A piezoresistive element according to claim 12, wherein said leadout wire means extend substantially axially out of said element.

15. A piezoresistive element according to claim 7, wherein several resistive paths are diffused into the semiconductor element within the areas of maximum strain thereof.

16. A piezoresistive element according to claim 15, wherein additional resistive paths are provided on the semiconductor element within the areas of minimal strain thereof.